United States Patent [19]

Ichihashi

[11] Patent Number: 5,943,113

[45] Date of Patent: Aug. 24, 1999

[54] METHOD OF PRODUCING A LIQUID CRYSTAL DISPLAY UNIT

[75] Inventor: Mitsuyoshi Ichihashi, Shizuoka, Japan

[73] Assignee: Fuji Photo Film Co., Ltd., Kanagawa, Japan

[21] Appl. No.: 09/168,667

[22] Filed: Oct. 9, 1998

[30] Foreign Application Priority Data

Oct. 9, 1997 [JP] Japan .................................. 9-277330

[51] Int. Cl.⁶ .......................... G02F 1/13; G02F 1/1341; G02F 1/1339; G02F 1/1333
[52] U.S. Cl. .......................... 349/187; 349/189; 349/190; 349/158; 349/126
[58] Field of Search .................................. 349/189, 190, 349/126, 153, 155, 191, 187, 158

[56] References Cited

U.S. PATENT DOCUMENTS

| | | | |
|---|---|---|---|
| 4,973,373 | 11/1990 | Hashimoto et al. ................. | 156/229 |
| 5,069,533 | 12/1991 | Yuasa et al. ........................ | 359/76 |
| 5,365,356 | 11/1994 | Mcfadden .......................... | 359/62 |
| 5,436,744 | 7/1995 | Arledge et al. .................... | 349/158 |
| 5,511,591 | 4/1996 | Abe .................................... | 141/7 |
| 5,537,235 | 7/1996 | Ishihara et al. .................... | 349/158 |
| 5,564,479 | 10/1996 | Yoshihara .......................... | 141/65 |
| 5,684,556 | 11/1997 | Shimamune ....................... | 349/158 |
| 5,798,813 | 8/1998 | Ohashi et al. ..................... | 349/154 |
| 5,828,435 | 10/1998 | Kato et al. ......................... | 349/190 |
| 5,854,664 | 12/1998 | Inoue et al. ....................... | 349/189 |

*Primary Examiner*—William L. Sikes
*Assistant Examiner*—Tarifur R. Chowdhury
*Attorney, Agent, or Firm*—Sughrue, Mion, Zinn, Macpeak & Seas, PLLC

[57] ABSTRACT

A method of producing a liquid crystal display unit, in which a flat substrate and a flexible film substrate are bonded to each other through a gap, and in which a liquid crystal is charged and sealed in a closed space of the gap enclosed by a frame-like sealing agent. The method comprises steps of: providing spacers on a bonding surface of the flat substrate in advance to thereby form the gap and transferring the sealing agent to a bonding surface of either one of the flat substrate and the film substrate; making the flat substrate enter into an insertion gap between a pair of pressure rollers and making the film substrate enter into the insertion gap at an inclined angle with respect to the flat substrate to thereby carry the flat substrate and the film substrate under pressure; at the same time, ejecting a required amount of the liquid crystal into a space between the flat substrate and the film substrate in accordance with the substrate-carrying velocity, the space being narrowed gradually toward the insertion gap; and squeezing the liquid crystal ejected into between the flat substrate and the film substrate in a direction reverse to the substrate-carrying direction to thereby fill the gap between the flat substrate and the film substrate with the liquid crystal.

21 Claims, 2 Drawing Sheets

METHOD OF PRODUCING A LIQUID CRYSTAL DISPLAY UNIT

BACKGROUND OF THE INVENTION

1. Field of the Invention

The present invention relates to a method of producing a liquid crystal display unit. More particularly, the present invention relates to a method for producing a liquid crystal display unit, in which a series of process of from a substrate bonding step to a liquid crystal injection and sealing step is simplified.

The present application is based on Japanese Patent Application No. Hei. 9-277330, which is incorporated herein by reference.

2. Description of the Related Art

Generally, a liquid crystal display unit is produced by a process comprising steps of: applying an orienting agent onto a pair of initially cleansed glass or plastic substrates; baking the substrates; after the step of baking, applying a rubbing treatment to the substrates; applying a sealing agent onto the substrates to bond the substrates to each other; injecting a liquid crystal into between the substrates; and, after the step of injecting, sealing a liquid crystal injection hole.

For bonding the substrates to each other, first, a spacing material for keeping the gap between the substrates constant is sprayed. The spacing material spray method is classified into a wet type and a dry type. Conventionally, the wet type in which a mixture of a spacing material and a liquid such as flon or alcohol is sprayed, has been the main current. However, the dry type spray method is advantageous in evenness of spacing material spray density, absence of spacing material lumps, etc., and therefore has begun to be established in recent years.

After a spacing material is sprayed, a UV-curing adhesive agent is applied onto a peripheral portion of a lower substrate. In the inverted or turned-over state, an upper substrate is bonded to the lower substrate. After pre-alignment and accurate alignment, the UV-curing adhesive agent is hardened to thereby temporarily bond the substrates to each other. Then, the substrates are heated to perform hardening and regular bonding at a temperature in a range of from 150 to 200° C. for several hours under the pressure of about 1000 kg (maximum) by a hot-pressing method. Thus, cells are formed.

For injection of a liquid crystal into each cell, first, the inside of the cell is vacuum-deaerated through a liquid crystal injection hole and, at the same time, the inside of a liquid crystal reservoir is deaerated. In this case, the injection hole is small and narrow so that it is difficult to deaerate the cell. Therefore, in order to improve the deaeration effect, for example, evacuation is performed for a long time, and further, the cell is heated. In this case, when deaeration is performed while the liquid crystal is more or less cooled to increase the viscosity of the liquid crystal to thereby suppress the vaporization of the liquid crystal and stirred, the deaeration effect is relatively enhanced.

Then, an evacuation pump is stopped and the cell and the liquid crystal reservoir are connected to each other so that a liquid crystal material is injected into the cell by use of capillarity of the cell. When a large part of the cell is filled with the liquid crystal, dried inert gas is introduced into the liquid crystal reservoir to press the liquid crystal reservoir. By the pressure, injection is continued to fill the cell with the liquid crystal.

Since the viscosity of the liquid crystal is generally high, it is difficult to inject the liquid crystal into the cell. If the liquid crystal material is forcedly injected, the surface of an oriented layer near the injection hole may be injured. When the cell and the liquid crystal reservoir are heated to reduce the viscosity of the liquid crystal after completion of vacuum-deaeration in order to avoid the aforementioned disadvantage, the injecting work is easily performed, and further, the surface of the oriented layer is prevented from being injured.

Afterwards, the injection hole of the cell filled with the liquid crystal is sealed. In this case, the periphery of the injection hole is wet with the liquid crystal. Accordingly, it is very difficult to wipe the liquid crystal only on the periphery of the injection hole to prevent air bubbles from being mixed in the liquid crystal. In order to seal the wet injection hole, there were conventionally used various methods such as a method in which the injection hole was vapor-deposition-coated or plated with a metal such as chrome, nickel, copper, gold, or- the like, so that the injection hole wet with the liquid crystal was sealed with solder, a method in which a wood's metal such as iridium, tin, lead, or the like, was inserted into the injection hole to temporarily seal the injection hole and then the injection hole was sealed with an adhesive agent after the liquid crystal was wiped, etc.

In the aforementioned conventional method for producing a liquid crystal display unit, however, the process of bonding the substrates to each other and the process of injecting the liquid crystal were separated independently. Accordingly, there was a drawback in that independent production lines for the two processes were required and the equipmental scale became large. Furthermore, troublesome operation and high-grade technique were required for the substrate bonding work and the liquid crystal injecting work.

That is, since the spacing material was disposed with uniform density without any lamp, a high-grade spray technique was required.

In order to make the electrodes of rear and front substrates coincide with each other, pre-alignment and accurate alignment had to be performed stepwise when the substrates were bonded to each other.

Since the inside of the cell had to be vacuum-deaerated securely in spite of the small injection hole, it was necessary to evacuate the cell for a long time and heat the cell to thereby enhance the deaeration effect. Further, in order to enhance the deaeration effect, it was necessary to perform vacuum-deaeration while more or less cooling the liquid crystal to increase the viscosity of the liquid crystal and stirring the liquid crystal.

On the other hand, in order to fill the cell with such a high-viscosity liquid crystal securely, it was necessary to heat both the cell and the liquid crystal reservoir after completion of vacuum-deaeration to thereby reduce the viscosity of the liquid crystal.

Furthermore, in order to seal the wet injection hole securely, there was required a method, or the like, in which the injection hole was vapor-deposition-coated or plated with a metal such as chrome, or the like, in advance so that the injection hole was sealed with solder after injection of the liquid crystal.

Accordingly, the conventional producing method had a drawback in that a long time was required for production and the cost of the product increased since equipmental cost increased and a troublesome producing process was required. Further, since the liquid crystal material was injected by use of capillarity, there was a drawback in that it was difficult to reduce the thickness of the resulting product and increase the area of the resulting product.

SUMMARY OF THE INVENTION

The present invention is based on the aforementioned circumstances. An object of the present invention is to provide a method of producing a liquid crystal display unit in which a process of bonding substrates to each other and a process of injecting a liquid crystal can be performed simultaneously so that production lines can be unified to obtain a simplified producing process to thereby achieve simplification of production equipment, shortening of the time required for production and shortening of the cost of the resulting product.

In order to achieve the above object, according to the aspect of the present invention, there is provided a method of producing a liquid crystal display unit, which comprises steps of: preparing a flat substrate and a flexible film substrate; providing spacers on a bonding surf-ace of the flat substrate; attaching a frame-like sealing agent to a bonding surface of one of the flat substrate and the film substrate; inserting the flat substrate into an insertion gap between a pair of pressure rollers; inserting the film substrate into the insertion gap at an inclined angle with respect to the flat substrate; carrying the flat substrate and the film substrate to press them with the pressure rollers, wherein a space between the flat substrate and the film substrate is gradually narrowed; and pouring a required amount of liquid crystal into the space between the flat substrate and the film substrate in accordance with a carried velocity of the flat substrate and the film substrate. In the method, a gap is formed between the flat substrate and the flexible film substrate through the spacers. Also, the method may further comprise a step of squeezing the liquid crystal between the flat substrate and the film substrate in an opposite direction of the carried direction to fill the gap between the flat substrate and the film substrate with the liquid crystal. The step of pouring is preferably conducted with the step of carrying.

According to the above method, bonding the substrates to each other and injection of the liquid crystal can be performed in one process. Accordingly, independent production lines and the vacuum-injection process are not required. Accordingly, equipment is simplified, and further, the time required for production can be shortened.

In the above method, the flat substrate is preferably a glass substrate. The combination of the glass substrate and the film substrate is suitable for a carrying system.

In the above method, the frame-like sealing agent is preferably transferred from a sealing agent transfer roller to one of the flat substrate and the film substrate which are being carried toward the pressure rollers. In this configuration, the transfer of the sealing agent can be performed in a series of process of-bonding the substrates to each other and injection of the liquid crystal.

The above method may further comprise a step of applying an adhesive agent to the spacers on the flat substrate which is being carried toward the pressure rollers. In this configuration, the application of the adhesive agent can be performed in a series of process of bonding the substrates to each other and injection of the liquid crystal.

In the above method, the sealing agent may comprise at least one of a thermosetting adhesive agent and an ultraviolet-curing adhesive agent. In this case, the above method preferably comprises a step of supplying at least one of heat and ultraviolet radiation to the flat substrate and the film substrate after passage through the pressure rollers so that the sealing agent is hardened to adhesively bond the substrates to each other. In this configuration, final bonding of the substrates to each other can be performed in a series of process of bonding the substrates to each other and injection of the liquid crystal.

DETAILED DESCRIPTION OF THE PREFERRED EMBODIMENT

Figure 2:
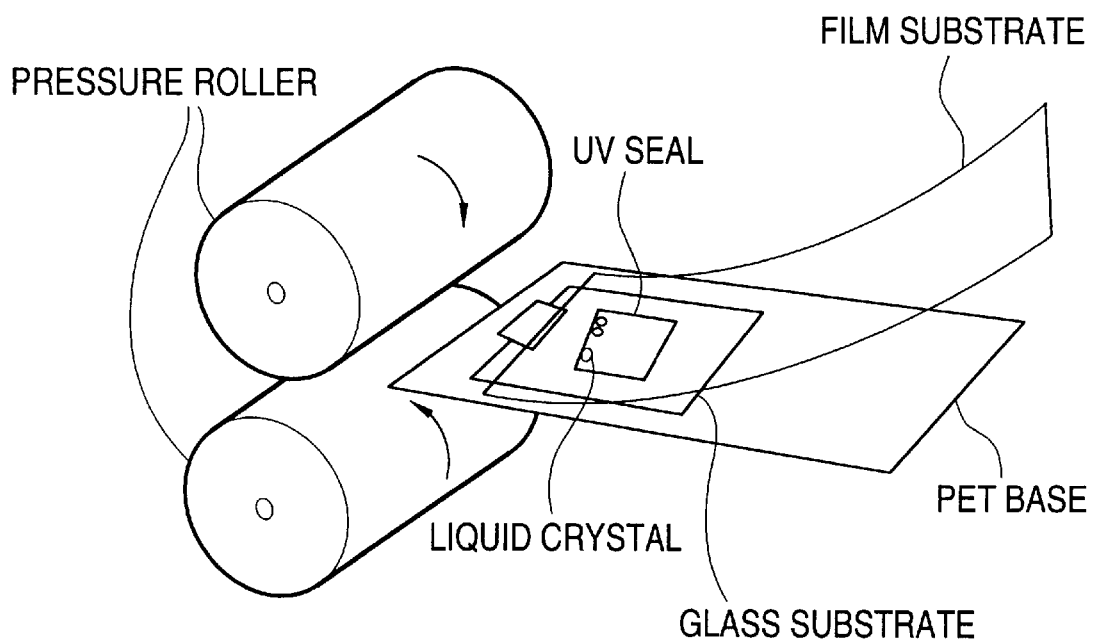
FIG. 2 is a perspective view showing a state just before lamination in the liquid crystal laminating process according to the embodiment of the present invention.
Figure 3:
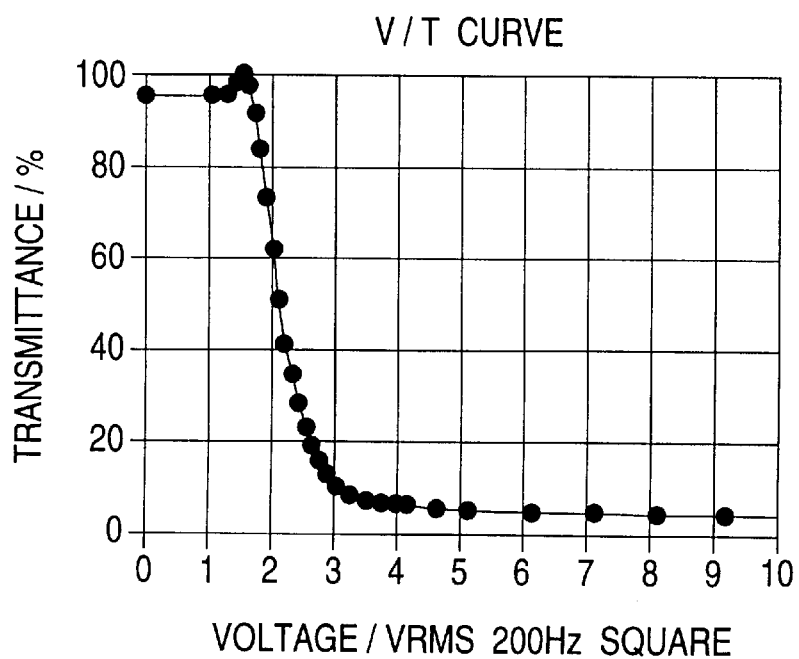
FIG. 3 is a graph showing the V/T characteristic of a liquid crystal device produced according to the embodiment of the present invention.

A method of producing a liquid crystal display unit according to a preferred embodiment of the present invention will be described below in detail with reference to FIGS. 1 to 3.

Figure 1:
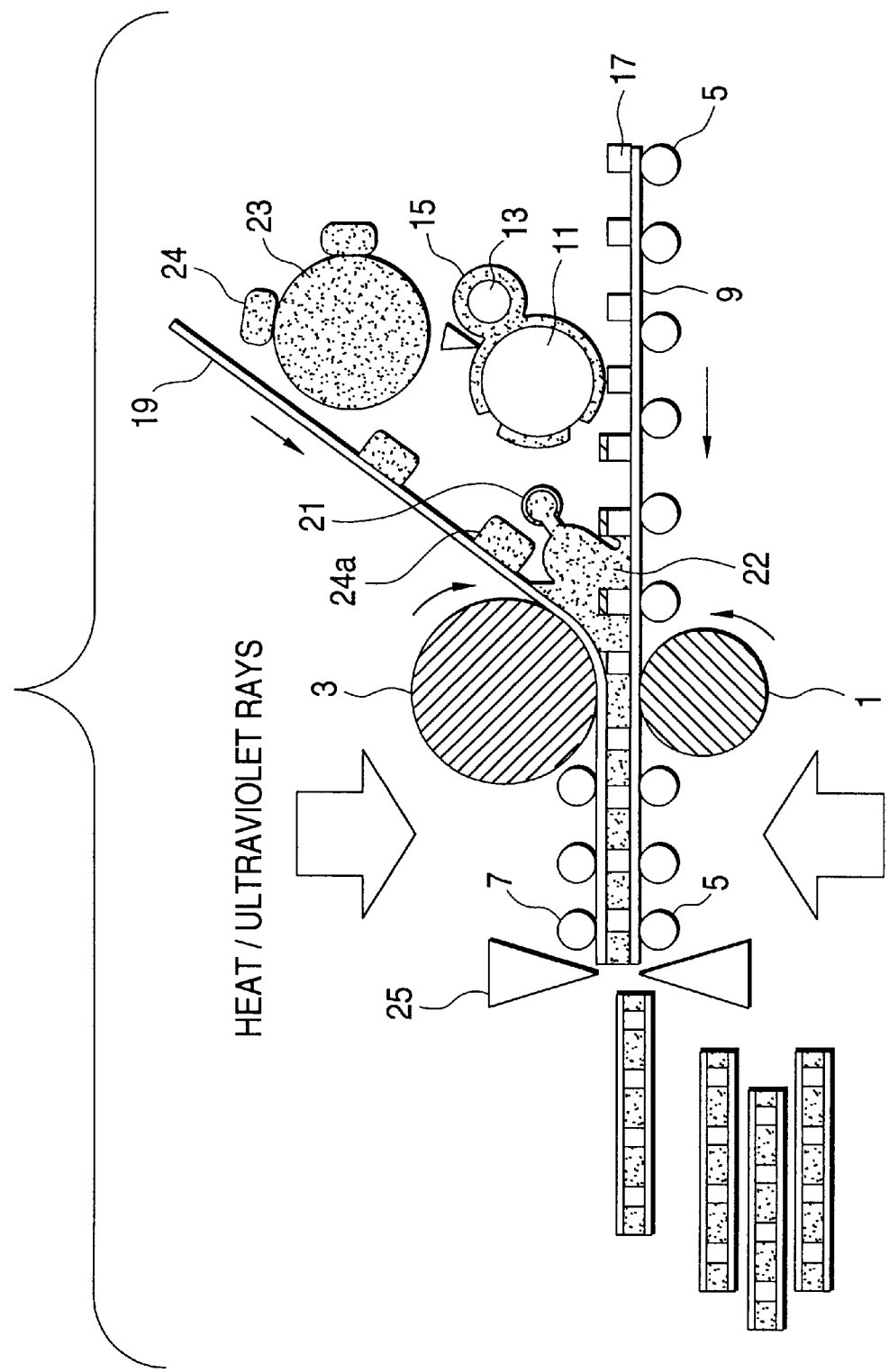
FIG. 1 is an explanatory view showing an example of a producing apparatus and a liquid crystal laminating process used in a method of producing a liquid crystal display unit according to the present invention.

FIG. 1 is an explanatory view showing an example of a producing apparatus and a liquid crystal laminating process used in the present invention. A small-diameter cylindrical pressure roller 1 and a large-diameter cylindrical pressure roller 3 are disposed so as to be opposite to each other with a predetermined insertion gap interposed therebetween and so that their axes extend in parallel with each other in one and the same direction. The pressure rollers 1 and 3 are provided to press a subject inserted in the predetermined insertion gap by rotating while keeping the predetermined insertion gap. In this example, the subject is provided to be carried left in FIG. 1 while being pressed when, for example, the pressure roller 1 and the pressure roller 3 are rotated counterclockwise and clockwise respectively.

A plurality of guide rollers 5 are disposed in the upstream and downstream sides of the pressure roller 1 in the carrying direction so that the axes of the guide rollers 5 extend in parallel with the axis of the pressure roller 1 in one and the same direction. The pressure roller 1 and the guide rollers 5 form a horizontal carrying path surface. Further, a plurality of guide rollers 7 are disposed in the downstream side of the pressure roller 3 in the carrying direction so that the axes of the guide rollers 7 extend in parallel with the axis of the pressure roller 3 in one and the same direction. The pressure roller 3 and the guide rollers 7 form a horizontal carrying path surface. Accordingly, a carrying path in which the guide rollers 5 are disposed in opposition to the guide rollers 7, is formed in the downstream side of the pressure rollers 1 and 3 in the carrying direction.

The guide rollers 5 in the upstream side of the pressure rollers 1 and 3 in the carrying direction are provided so that a glass substrate 9 laid on a PET base (not shown) is carried into the gap between the pressure rollers 1 and 3. An adhesive agent applying roller 11 is disposed above the guide rollers 5 with the glass substrate 9 interposed therebetween so that the axis of the adhesive agent applying roller 11 extends in parallel with the axes of the pressure rollers 1 and 3 in one and the same direction.

An adhesive agent supply roller 13 is disposed in a neighbor of the adhesive agent applying roller 11 so that the axis of the adhesive agent supply roller 13 extends in parallel with the axis of the adhesive agent applying roller 11 in one and the same direction. The outer circumferential surface of the adhesive agent supply roller 13 is brought into contact with the outer circumferential surface of the adhesive agent applying roller 11, so that the adhesive agent supply roller 13 supplies an adhesive agent 15 to the adhesive agent applying roller 11. The outer circumferential surface of the adhesive agent applying roller 11 supplied with the adhesive agent 15 is brought into contact with spacers 17 formed on the upper surface of the glass substrate 9, so that the adhesive agent 15 is applied onto the spacers 17.

A film substrate 19 constituting a color filter side is laid on the upper surface of the glass substrate 9. Accordingly, the glass substrate 9 and the film substrates 19 laid on the glass substrate 9 are put into the insertion gap between the pressure rollers 1 and 3 so as to be carried while being pressed. In this case, the film substrate 19 is carried into the insertion gap at a predetermined inclined angle with respect to the glass substrate 9. That is, an alienation space just in front of the insertion gap between the pressure rollers 1 and 3 is formed between the glass substrate 9 and the film substrate 19.

A liquid crystal injection nozzle 21, which is long in the axial direction of the pressure rollers 1 and 3, is disposed in the alienation space. The liquid crystal injection nozzle 21 has an opening which ejects a liquid crystal 22 into the insertion gap between the pressure rollers 1 and 3. Accordingly, in the state where the glass substrate 9 and the film substrate 19 are carried toward the pressure rollers 1 and 3, the liquid crystal 22 ejected from the liquid crystal injection nozzle 21 is injected into between the glass substrate 9 and the film substrate 19.

The liquid crystal ejected from the liquid crystal injection nozzle 21 is controlled so that a required amount of the liquid crystal is ejected in accordance with the carrying velocity. Thus, a region closed by a frame-like sealing agent 24 which will be described later, is filled with the liquid crystal.

A sealing agent transfer roller 23 having its axis extending in parallel with the axis of the pressure roller 3 in one and the same direction is disposed in a neighbor of the film substrate 19 carried toward the pressure roller 3 and in opposition to the bonding surface of the film substrate 19. A sealing agent supply device (not shown) is provided to supply the sealing agent 24 to the outer circumferential surface of the sealing agent transfer roller 23. The sealing agent 24 is supplied to the sealing agent transfer roller 23 so as to be, for example, in the form of a frame. The sealing agent transfer roller 23 having the supplied sealing agent 24 on its outer circumferential surface comes into contact with the bonding surface of the film substrate 19 and rotates in synchronism with the carrying speed of the film substrate 19, so that the frame-like sealing agent 24 is transferred to the bonding surface of the film substrate 19.

A UV-curing resin can be preferably used as the sealing agent 24. Although this embodiment has shown the case where the sealing agent transfer roller 23 is disposed in opposition to the film substrate 19, the sealing agent transfer roller 23 may be disposed in opposition to the glass substrate 9 to transfer the sealing agent 24 to the glass substrate 9. Further, the glass substrate may -be replaced by a plastic substrate.

A cutter 25 is disposed in a terminal of the guide rollers 5 and 7 in the downstream side of the pressure rollers 1 and 3 in the carrying direction. The glass substrate 9 and the film substrate 19 bonded to each other by the pressure rollers 1 and 3 are cut by the cutter 25 along cutting line in the roller axial direction into pieces successively one by one in the carrying direction.

A heating device (not shown) and an ultraviolet radiation lamp (not shown) are provided between the pressure rollers 1, 3 and the cutter 25 so that the heating device and the ultraviolet radiation lamp supply heat and ultraviolet rays to cells nipped and carried by the guide rollers 5 and 7.

Although the aforementioned producing apparatus can be preferably applied to a producing method of this embodiment which will be described later, the producing method according to the present invention may be carried out by a producing apparatus having another configuration than the configuration of the aforementioned producing apparatus.

A method of producing a liquid crystal display unit according to this embodiment of the present invention will be described below.

In the producing method, a glass substrate 9 and a film substrate 19 are used as a rear substrate and a front substrate (color filter side substrate) respectively in the liquid crystal display unit.

A common electrode and a segment electrode are formed in the glass substrate 9 and the film substrate 19 respectively in advance so as to be disposed in opposition to each other after bonding of the substrates.

Further, an orientated film is formed in the glass substrate 9 and subjected to a rubbing treatment in advance. A PET base-containing glass substrate is preferably used as the glass substrate 9. Spacers 17 are formed on the bonding surface of the glass substrate 9 in advance by photoetching with use of a predetermined masking pattern. The bonding surface of the film substrate 19 is dip-coated with PVA and then subjected to a rubbing treatment in advance.

In the aforementioned producing apparatus, first, the sealing agent 24 is transferred to the bonding surface of the film substrate 19 or of the glass substrate 9. A closed flamelike sealing agent is used as the sealing agent 24 so that the liquid crystal 22 is enclosed and sealed by the transferred sealing agent 24 after the film substrate 19 and the glass substrate 9 are bonded to each other. The sealing agent 24 may be transferred before the laminating process or just before pressing of the film substrate 19 and the glass substrate 9 in the laminating process. Incidentally, FIG. 1 shows the case where the sealing agent 24 is transferred to the film substrate 19 by use of the sealing agent transfer roller 23 just before the pressing.

In a substrate bonding and liquid crystal sealin g process (hereinafter referred to as "liquid crystal laminating process") in which bonding the glass substrate 9 and the film substrate 19 to each other and sealing the liquid crystal 22 are performed simultaneously, the glass substrate 9 is carried toward the pressure rollers 1 and 3 by the guide rollers 5. In this case, the adhesive agent 15 is applied onto the preliminarily formed spacers 17 by the adhesive agent applying roller 11.

On the other hand, the film substrate 19 is carried into the insertion gap between the pressure rollers 1 and 3 at a predetermined inclined angle with respect to the glass substrate 9. Accordingly, the glass substrate 9 and the film substrate 19 enter into the insertion gap between the pressure rollers 1 and 3 so as to be pressed, so that the glass substrate 9 and the film substrate 19 are temporarily bonded to each other through the adhesive agent 15 on the spacers 17 and through the sealing agent 24. In this case, the glass substrate 9 and the film substrate 19 can be aligned with each other accurately by a conventional printing technique using a laminator.

In the alienation space formed just in front of the insertion gap between the pressure rollers 1 and 3, the liquid crystal 22 is ejected from the liquid crystal injection nozzle 21 toward the insertion gap. Accordingly, the liquid crystal 22 thus ejected is injected into between the glass substrate 9 and the film substrate 19.

The distance between the glass substrate 9 and the film substrate 19 is narrowed gradually toward the insertion gap. Accordingly, as the glass substrate 9 and the film substrate 19 enter into the insertion gap, the insertion gap between the glass substrate 9 and the film substrate 19 is filled with a main part of the liquid crystal 22 injected into between the glass substrate 9 and the film substrate 19 and, at the same time, the residual part of the liquid crystal 22 is relatively moved in a direction reverse to the substrate carrying direction so as to be extruded.

Accordingly, in the state where the liquid crystal 22 is passed through the insertion gap so as to be squeezed there, the liquid crystal 22 is injected into between the glass substrate 9 and the film substrate 19 with no room for mixing air bubbles in the liquid crystal 22 so that the insertion gap is fully filled with the liquid crystal 22.

Under the above condition, when the glass substrate 9 and the film substrate 19 are pressed and carried successively, a terminal side 24a of the sealing agent 24 is relatively moved. The terminal side 24a enters into a surplus amount of the liquid crystal 22 remaining in the alienation space, so that the terminal side 24a is pressed against both the glass substrate 9 and the film substrate 19 in the insertion gap by the pressure rollers 1 and 3.

As a result, the liquid crystal 22 between the glass substrate 9 and the film substrate 19 is enclosed and sealed by the sealing agent 24 which is transferred so as to be shaped like a frame.

After the glass substrate 9 and the film substrate 19 pass through the pressure rollers 1 and 3, heating and ultraviolet radiation are applied to the glass substrate 9 and the film substrate 19 by the heating device and the ultraviolet radiation lamp. As a result, the sealing agent 24 formed of a UV-curing resin is hardened, and further, the adhesive agent 15 on the spacers 17 is hardened, and therefore the glass substrate 9 and the film substrate 19 are adhesively bonded and fixed to each other.

The glass substrate 9 and the film substrate 19 thus adhesively bonded and fixed to each other are cut at the portion of the sealing agent 24 by the cutter 25 so that cells are produced one by one.

As described above, according to the liquid crystal display unit producing method using a liquid crystal laminating process, a liquid crystal display unit which is so high in reliability as to be free from mixing of air bubbles in the liquid crystal can be produced easily in a short time.

Since both bonding the substrates to each other and injection of the liquid crystal 22 can be performed in one process, the provision of independent production lines conventionally required becomes unnecessary, and further, the vacuum injection process becomes unnecessary. Accordingly, equipment can be simplified so that equipmental cost can be reduced.

Since the producing process can be reduced, the producing time can be shortened, and further, the cost of the product can be reduced.

Since injection of the liquid crystal material by using capillarity as in conventional case is not required so that the liquid crystal 22 can be injected by the liquid crystal laminating process, both reduction in the thickness of the liquid crystal display unit and increase in the area of the liquid crystal display unit can be achieved easily.

Since a sensitive material conventionally used in a laminate can be used as the film substrate 19, also the cost of the product can be reduced.

In addition, since a troublesome and high-grade technique conventionally required but hardly standardized is not required, automation can be achieved easily.

EXAMPLE

A result of evaluation of a liquid crystal display unit actually produced by the producing method according to the aforementioned embodiment of the present invention will be described below. FIG. 2 is a perspective view showing a state just before lamination in the liquid crystal laminating process according to the embodiment of the present invention; and FIG. 3 is a graph showing the V/T characteristic of a liquid crystal device produced according to the embodiment of the present invention. Conditions for carrying out the present invention are as follows.

<Substrate>

Glass substrate made by Nippon Sheet Glass Co., Ltd.
30 $\Omega$/□ITO adhesive-backed
t=1.1 mm
10 cm square Film substrate
100 $\Omega$/□ITO adhesive-backed
t=125 $\mu$m
PET base-containing
30 cm wide <Glass Substrate Treatment>

Oriented film formation
After the glass substrate is cleansed with pure water and dried, SE-150 is spin-coated with a 1:1 mixture of a spin coating solution and a solvent (thinner B).
The substrate is heated and hardened at 250° C. for one hour. Rubbing is performed at 1400 turns by a rubbing apparatus.
Incidentally, since the spacer baking temperature is 220° C., SE-150 having a curing temperature higher than 220° C. is selected.

Spacer formation
A negative resist SP-6.5 is used.

1. Resist Lamination
Lamination is performed by a laminator while a tension is applied to the resist laid on the PET base. The temperature of each of upper and lower rollers in the laminator is selected to be 120° C. The lamination pressure is selected to be 2 kg/M$^2$. The roller velocity is selected to be 0.2 m/min.
Incidentally, when no tension is applied, air bubbles are mixed into between the resist and the glass substrate. When the laminating temperature is not higher than 110°C., adhesion is worsened. When the laminating temperature is not smaller than 130°C., the thickness of the film becomes small.

2. Hot Separation
After the resulting substrate is left for 1 hour after the lamination, it is hot-separated at 45° C.

3. UV Exposure
Exposure is performed at 200 mJ/cm$^2$. A mask pattern having 9 $\mu$m-diameter holes disposed at intervals of a pitch of 150 $\mu$m is used.

4. Development

CA1 is diluted to 11 times. Development is performed at room temperature for a time of from 4 to 5 minutes. After washing, air blasting is performed.

Incidentally, when the spacers are formed directly on ITO, 20 to 30% of the spacers peel off. When the spacers are formed on SE-150, no spacer peels off.

5. Baking

220° C., 1 hour.

<Film Substrate Treatment>

Oriented film formation

2% of PVA-105 is heated and dissolved in a 1:1 mixture solvent of water and ethanol. After filtration, the film substrate cut in the direction of the optical axis is dip-coated. After air-dried, the resulting substrate is heated at 100° C. for 30 minutes so as to be hardened. The resulting substrate is hand-rubbed with a ben-cotton to perform an orienting treatment to thereby obtain uniaxial planer orienting characteristic.

Incidentally, no warp is generated in the substrate per se in the condition of 100° C. and 30 minutes but a slight warp is generated in the substrate in the condition of 130° C. and 30 minutes.

<Bonding>

Sealing Agent Transfer

A UV-cure resin made by EHC Corp. is bonded thinly on a glass plate and transferred twice or three times to the center of the glass substrate having the spacers formed thereon, without any sealing gap by use of a 3.5 cm×3.5 cm relief-printing plate used at the time of the production of SLM.

Liquid Crystal Lamination and Bonding

As the liquid crystal, a mixture of ZLI-1132 and 0.05% of S-811 is used. Lamination is performed by a laminator while a tension is applied in the condition that two or three drops of the liquid crystal are dripped to the lamination head portion of the sealing portion of the glass substrate laid on the PET base and having the sealing agent transferred and then an end of the film substrate is fixed by a cellophane tape.

The rubbing direction is a crossing direction. The roller is at room temperature. The roller pressure is 2 kg/cm$^2$ and the roller velocity is 0.1 mm/min. Just after lamination, UV radiation is performed by a 100 W mercury lamp so that the UV-curing resin which is a sealing agent transferred is hardened.

<Evaluation Result>

Three cells are produced in the aforementioned conditions and the state of liquid crystal lamination, gap evenness and the state of operation are evaluated.

State of Liquid Crystal Lamination

Although an excessive amount of the UV-curing resin is given so that the UV-curing resin enters into a display area, air bubbles are prevented from being mixed in the liquid crystal, and further, the state of bonding the substrates to each other is good.

Gap Evenness

Except dust and its vicinity, the gap is substantially even and about 6.5 μm as large as the height of the spacers.

State of Operation

There is no short-circuiting and no current conduction failure, so that the resulting device operates clearly. The device operates clearly also in areas near the sealing material. Incidentally, the V/T characteristic of the liquid crystal device thus produced is shown in FIG. 3.

As described above in detail, in the method of producing a liquid crystal display unit according to the aspect of the present invention, bonding the substrates to each other and injection of the liquid crystal can be performed in one process. Accordingly, independent production lines and the vacuum injection process are not required. Accordingly, equipment can be simplified, so that equipmental cost can be reduced. Further, since the production process can be reduced, the producing time can be shortened, and further, the cost of the product can be reduced. As a result, simplification of production equipment, reduction of the producing time and reduction of the cost of the product can be achieved.

Further, in the producing method in which a sealing agent is transferred to a flat substrate or a film substrate by use of a sealing agent transfer roller in the middle of carrying the substrate, transfer of the sealing agent can be performed in a series of process of bonding the substrates to each other and injection of the liquid crystal.

Further, in the producing method in which an adhesive agent is applied onto spacers of a flat substrate by use of an adhesive agent applying roller in the middle of carrying the flat substrate, application of the adhesive agent can be performed in a series of process of bonding the substrates to each other and injection of the liquid crystal.

Further, in the producing method in which a thermosetting or ultraviolet-curing adhesive agent is used as the sealing agent so that heat or ultraviolet radiation is supplied to a flat substrate and a film substrate after the substrates pass through the pressure rollers, final bonding of the substrates to each other can be performed in a series of process of bonding the substrate to each other and injection of the liquid crystal.

What is claimed is:

1. A method of producing a liquid crystal display unit, comprising steps of:

preparing a flat substrate and a flexible film substrate;

providing spacers on a bonding surface of the flat substrate;

attaching a frame-like sealing agent to a bonding surface of one of the flat substrate and the film substrate;

inserting the flat substrate into an insertion gap between a pair of pressure rollers;

inserting the film substrate into the insertion gap at an inclined angle with respect to the flat substrate;

carrying, in a predetermined direction the flat substrate and the film substrate to press them with the pressure rollers, wherein a space between the flat substrate and the film substrate is gradually narrowed; and pouring a required amount of liquid crystal into the space between the flat substrate and the film substrate in accordance with a carried velocity of the flat substrate and the film substrate.

2. The method of claim 1, wherein a gap is formed between the flat substrate and the flexible film substrate through the spacers.

3. The method of claim 2, further comprising a step of squeezing the liquid crystal between the flat substrate and the film substrate in an opposite direction of the substrate carrying direction to fill the gap between the flat substrate and the film substrate with the liquid crystal.

4. The method of claim 1, further comprising a step of squeezing the liquid crystal between the flat substrate and the film substrate in an opposite direction of the carried direction to fill a gap formed between the flat substrate and the film substrate through the spacers with the liquid crystal.

5. The method of claim 1, wherein the step of pouring is conducted with the step of carrying.

6. The method of claim 1, wherein the flat substrate includes a glass substrate.

7. The method of claim 6, wherein, in the step of attaching, the frame-like sealing agent is transferred from a sealing agent transfer roller to one of the flat substrate and the film substrate which are being carried toward the pressure rollers.

8. The method of claim 7, further comprising a step of applying an adhesive agent to the spacers on the flat substrate which is being carried toward the pressure rollers.

9. The method of claim 8, wherein the sealing agent comprises at least one of a thermosetting adhesive agent and an ultraviolet-curing adhesive agent, the method further comprises a step of supplying at least one of heat and ultraviolet radiation to the flat substrate and the film substrate after passage through the pressure rollers so that the sealing agent is hardened to adhesively bond the substrates to each other.

10. The method of claim 7, wherein the sealing agent comprises at least one of a thermosetting adhesive agent and an ultraviolet-curing adhesive agent, the method further comprises a step of supplying at least one of heat and ultraviolet radiation to the flat substrate and the film substrate after passage through the pressure rollers so that the sealing agent is hardened to adhesively bond the substrates to each other.

11. The method of claim 6, further comprising a step of applying an adhesive agent to the spacers on the flat substrate which is being carried toward the pressure rollers.

12. The method of claim 11, wherein the sealing agent comprises at least one of a thermosetting adhesive agent and an uitraviolet-curing adhesive agent, the method further comprises a step of supplying at least one of heat and ultraviolet radiation to the flat substrate and the film substrate after passage through the pressure rollers so that the sealing agent is hardened to adhesively bond the substrates to each other.

13. The method of claim 6, wherein the sealing agent comprises at least one of a thermosetting adhesive agent and an ultraviolet-curing adhesive agent, the method further comprises a step of supplying at least one of heat and ultraviolet radiation to the flat substrate and the film substrate after passage through the pressure rollers so that the sealing agent is hardened to adhesively bond the substrates to each other.

14. The method of claim 1, wherein, in the step of attaching, the frame-like sealing agent is transferred from a sealing agent transfer roller to one of the flat substrate and the film substrate which are being carried toward the pressure rollers.

15. The method of claim 14, further comprising a step of applying an adhesive agent to the spacers on the flat substrate which is being carried toward the pressure rollers.

16. The method of claim 15, wherein the sealing agent comprises at least one of a thermosetting adhesive agent and an ultraviolet-curing adhesive agent, the method further comprises a step of supplying at least one of heat and ultraviolet radiation to the flat substrate and the film substrate after passage through the pressure rollers so that the sealing agent is hardened to adhesively bond the substrates to each other.

17. The method of claim 14, wherein the sealing agent comprises at least one of a thermosetting adhesive agent and an ultraviolet-curing adhesive agent, the method further comprises a step of supplying at least one of heat and ultraviolet radiation to the flat substrate and the film substrate after passage through the pressure rollers so that the sealing agent is hardened to adhesively bond the substrates to each other.

18. The method of claim 1, further comprising a step of applying an adhesive agent to the spacers on the flat substrate which is being carried toward the pressure rollers.

19. The method of claim 18, wherein the sealing agent comprises at least one of a thermosetting adhesive agent and an ultraviolet-curing adhesive agent, the method further comprises a step of supplying at least one of heat and ultraviolet radiation to the flat substrate and the film substrate after passage through the pressure rollers so that the sealing agent is hardened to adhesively bond the substrates to each other.

20. The method of claim 1, wherein the sealing agent comprises at least one of a thermosetting adhesive agent and an ultraviolet-curing adhesive agent, the method further comprises a step of supplying at least one of heat and ultraviolet radiation to the flat substrate and the film substrate after passage through the pressure rollers so that the sealing agent is hardened to adhesively bond the substrates to each other.

21. The method of claim 20, wherein the sealing agent comprises at least one of a thermosetting adhesive agent and an ultraviolet-curing adhesive agent, the method further comprises a step of supplying at least one of heat and ultraviolet radiation to the flat substrate and the film substrate after passage through the pressure rollers so that the sealing agent is hardened to adhesively bond the substrates to each other.

* * * * *